(12) United States Patent
Gomes et al.

(10) Patent No.: US 6,267,349 B1
(45) Date of Patent: Jul. 31, 2001

(54) PRECISION VALVE CONTROL

(75) Inventors: Karl G. Gomes, Dix Hills; Vito Liantonio, Glen Cove, both of NY (US)

(73) Assignee: Target Rock Corporation, Farmingdale, NY (US)

( * ) Notice: Subject to any disclaimer, the term of this patent is extended or adjusted under 35 U.S.C. 154(b) by 0 days.

(21) Appl. No.: 08/254,654

(22) Filed: Jun. 3, 1994

Related U.S. Application Data

(63) Continuation of application No. 07/951,386, filed on Sep. 25, 1992, now abandoned.

(51) Int. Cl.$^7$ ....................................................... F16K 1/00
(52) U.S. Cl. ............................. 251/30.04; 251/38; 251/44
(58) Field of Search ............................. 251/30.03, 30.04, 251/38, 44, 129.04, 129.08

(56) References Cited

U.S. PATENT DOCUMENTS

| | | | | |
|---|---|---|---|---|
| 3,850,196 | * | 11/1974 | Fales | 251/129.08 X |
| 4,304,264 | * | 12/1981 | McClintock et al. | 251/30.04 X |
| 4,311,296 | * | 1/1982 | Scheffel | 251/38 X |
| 4,456,031 | * | 6/1984 | Taplin | 13/625.64 X |
| 4,478,245 | * | 10/1984 | Bender | 137/487.5 X |
| 4,526,340 | * | 7/1985 | Kolchinsky et al. | 251/38 |
| 4,544,128 | * | 10/1985 | Kolchinsky et al. | 251/30.01 |
| 4,790,511 | * | 12/1988 | Gehrig et al. | 251/30.02 |
| 4,938,118 | * | 7/1990 | Wolfges et al. | 137/625.64 X |
| 4,938,450 | * | 7/1990 | Tripp et al. | 251/30.03 |
| 4,960,365 | * | 10/1990 | Horiuchi | 137/625.64 X |
| 4,995,586 | * | 2/1991 | Gensberger et al. | 251/30.04 |
| 5,048,790 | * | 9/1991 | Wells | 251/30.04 |
| 5,178,358 | * | 1/1993 | Schwelm | 251/29 |

FOREIGN PATENT DOCUMENTS

| | | | | |
|---|---|---|---|---|
| 2416235 | * | 10/1975 | (DE) | 251/29 |
| 3020152 | * | 12/1981 | (DE) | 251/30.02 |

* cited by examiner

*Primary Examiner*—Gerald A. Michalsky
(74) *Attorney, Agent, or Firm*—Stefan J. Klauber; Klauber & Jackson

(57) ABSTRACT

A precision valve control for an hermetically sealed hydraulic valve system which operates with a solenoid driven magnetic actuator. The magnetic actuator forms a toroidal magnetic force field of varying strength which causes controlled movement of a core rod linked to a pilot. The pilot, in turn, causes actuation of the main disc to the desired valve position. Actual valve position is remotely ascertained, by position of the magnet (or core) within the magnetic field, by means of a Linear Variable Differential Transformer (LVDT). The LVDT creates variable voltages predeterminately related to position of the rod within the magnetic field. The LVDT voltage is compared, by an electronic comparator, to an input command voltage, calibrated to a specific valve position. Deviation between the LVDT voltage feedback signal and input command voltage signal causes generation of an error signal which is amplified and applied to the solenoid to vary the magnetic field to correct the valve position. The fast, continuous feedback control permits constant accurate positioning of the main valve to an accuracy within 0.5% of the valve's command position. The LVDT feedback and comparator control permits, steady state electronic current limiting to prevent excessive heating of the solenoid coil. Other features include direct acting/reverse acting control, as well as control of slew rate and valve seat protection.

10 Claims, 2 Drawing Sheets

PRECISION VALVE CONTROL

This application is a continuation of application Ser. No. 07/951,386, filed Sep. 25, 1992, now abandoned.

FIELD OF THE INVENTION

This invention relates to precision control of valve systems and particularly to precision, fully electronically controlled, hermetically sealed valve systems.

BACKGROUND OF THE INVENTION

Hydraulic valve systems, whether completely sealed or not, rely on calibrated input control for the positioning of the valve and control of flow rate and the like. The input control is generally mechanical or electro-mechanical in nature. Accordingly, relatively large deviations from the desired valve position and flow rate are inevitable. Even fully electronic controls do not overcome such deviations, because of the mechanical nature of the valves involved, as well as the constantly varying hydraulic pressures used in the actuation of the valve or valves.

SHORT DESCRIPTION OF THE INVENTION

It is accordingly an object of the present invention to provide a highly accurate precision valve control system utilizing an electronic control signal and continuous electronic feedback.

It is a further object of the present invention to provide such precision valve control system having a completely sealed hydraulic valve.

It is a still further object of the present invention to provide such precision valve control system with variable split ranging, slew rate control, tight shutoff, seat protection and steady state current limiting.

These and other objects, features and advantages of the resent invention will become more evident from the following discussion and drawings in which:

SHORT DESCRIPTION OF THE DRAWINGS

Figure 1:
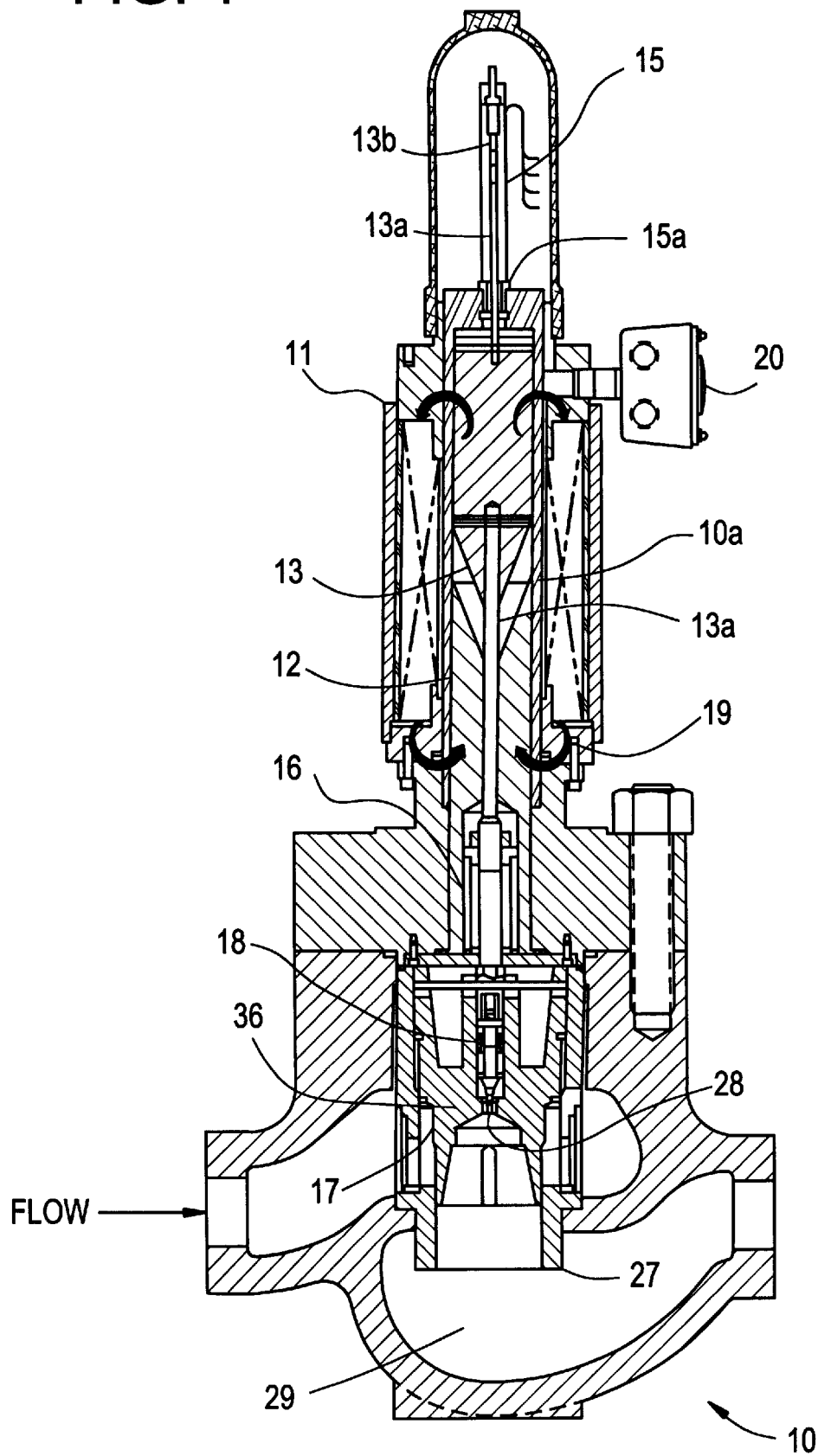
Figure 2:
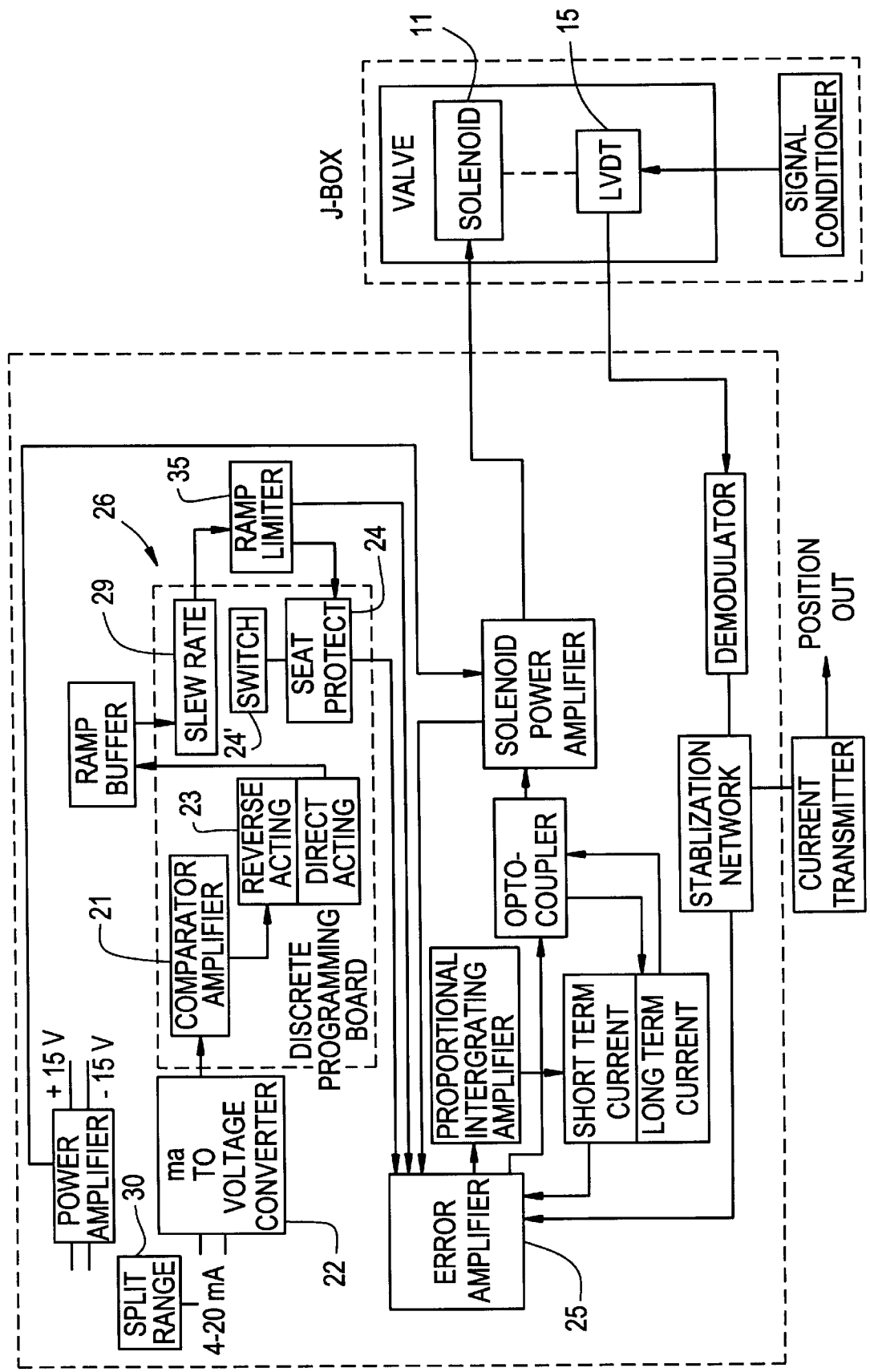

FIG. 1 is a cross section view of an hermetically sealed valve system with the precision valve control of the present invention; and FIG. 2 is a schematic block diagram of the feedback control and precision actuation of the valve control of the present invention.

DETAILED DESCRIPTION OF THE INVENTION

Generally the present invention comprises a precision valve control for a sealed, preferably hydraulic, valve system which operates with a solenoid driven magnetic actuator. The magnetic actuator forms a magnetic force field, generally of toroidal configuration, of varying strength which causes controlled movement of a linkage element, such as a core rod, linked to a main disc or a pilot (used in a large valve system). If linked to a pilot, the pilot, in turn, causes actuation of a main disc to the desired overall valve position.

In accordance with the present invention, electronic input control signals, which control the strength of the magnetic force field and valve movement, are continuously compared by comparator means to an electronic feedback signal from actual valve position monitoring means. Deviation control means generates an error signal with actual position deviation of the valve, from the desired input position. The error signal causes the solenoid to adjust its output, with a change in the strength of the magnetic force field, and with concomitant change in valve position, until the error signal is substantially eliminated.

Precision electronic components, high gain feedback control, and an accurate position sensor, permit the precision valve control of the present invention, with continuous feedback control, to achieve constant accurate positioning of the valve to an accuracy within 0.5% of the valve's input command position. Friction and magnetic hysteresis are also virtually eliminated.

In a preferred embodiment, actual valve position is remotely ascertained, by position of the magnet (or core) within the magnetic field, by means of a Linear Variable Differential Transformer (LVDT). The LVDT creates variable voltages predeterminately related to position of the rod within the magnetic field. The LVDT voltage is compared, by an electronic comparator, to an input command current, converted to a comparison voltage and calibrated to a specific valve position. Deviation between the LVDT voltage feedback signal and input command current signal causes generation of the error signal which is amplified and applied to the solenoid to vary the magnetic field to correct the valve position.

With the continuous feedback control, the valve of the present invention may optionally be provided with various additional elements and controls including continuously variable split ranging; selectable direct/reverse acting positioner; continuously variable slew rate; shutoff seat protection; and steady state current limiting for solenoid coil protection.

With a 4 to 20 mA position input signal range, the split ranging is accomplished by connecting the 4 to 20 mA command to the series connected inputs of two modulating valve positioners. Each valve positioner has controls, i.e., a direct acting or reverse acting selector switch; a selector switch for 4 mA start valve stroke/or finish valve stroke at 20 mA; and a finish valve stroke/or start valve stroke, continuously variable dial, which can be set within the limits of 4 to 20 mA.

The direct acting/reverse acting selector switch allows assignment of the direction of valve movement with respect to the input command signal.

The start valve stroke at 4 mA/finish valve stroke at 20 mA selector switch works in conjunction with the finish valve stroke/start valve stroke continuously variable dial. Thus, for example if the switch is set to the start valve stroke at the 4 mA position, then the valve stroke will finish at the setting of the continuously variable dial setting. Conversely, if the switch is set to the finish valve stroke at the 20 mA position, then the valve will start its stroke at the setting on the continuously variable dial. Thus, in the latter case, if the dial setting is at 13 mA, and the direct acting switch position is chosen, the valve will be at 0% of stroke when the command is 13 mA or less. As the command progresses from 13 mA to 20 mA, the valve progresses from 0% of stroke to 100% of stroke.

Split ranging is generally utilized in heating/cooling applications and in applications where the turndown ratio needs to be extended by using a small valve and a large valve.

Slew rate control is effected by the use of two independent, continuously variable controls. The first control allows for selection of the valve opening slew rate over the range of 5% per second to 105% per second. The second control allows the valve closing slew rate to be adjusted over the same range.

With operations involving high pressures where the velocity of the valve can become excessive with the possibility of valve damage, it is desirable that the system be provided with shutoff seat protection. An on/off switch enables or disables this protection, which operates in conjunction with a fail open/fail close selector switch (at installation this switch is set to the configuration of the valve). When a fail open switch is used, the valve will be shut tight below 25% of its full stroke. If the seat protection switch is in the off or disable position, the valve will travel through the complete 100% of its stroke.

A further preferred feature is steady state current limiting means which prevents excessive heating of the valve solenoid coil where the valve is driven to its limit stop. In such embodiment, feedback control in the valve limit stop is non-existent, and the solenoid current would be driven to its maximum value. Accordingly, the current limiting means reduces the power to the coil without causing the valve to back out of the limit stop.

DETAILED DESCRIPTION OF THE DRAWINGS AND THE PREFERRED EMBODIMENT

With specific reference to the drawings, in FIG. 1 a sealed hydraulic valve system 10 is shown with a normally open valve position. During operation, a current is supplied to the solenoid 11 which induces toroidal magnetic field 19 through the body (bonnet tube) 10a of the valve 10. Fixed core 12 exerts an downward pulling force on plunger 13 against return spring 16.

At its lower end, the plunger 13 is affixed to a pilot 18. Once the solenoid 11 is energized, the magnetic force draws the plunger 13 towards the fixed core 12. Since the plunger 13 and pilot 18 are rigidly linked by way of the disc rod 13a, the pilot 18 is forced downward toward the vent port 28. Fluid passes through conduit 36 above main disc 17. Pressure is however equalized when the main disc 17 is in the open position. When the pilot 18 is seated, it closes off the passageway for the fluid above the main disc 17 to escape. This causes the pressure above the main disc 17 to build, hence increasing the net force acting downward on the main disc 17. The main disc is now forced downward toward its seat 27. The continued magnetic force between the plunger 13 and fixed core 12 overcomes the return spring's force and keeps the pilot 18 seated. This allows the main disc 17 to close and shut off any flow to the outlet 29.

Movement of the core 13b, also directly attached to the top of the plunger 13 by a core rod 13a, through the indicator tube 15a provides accurate measure of the valve's main disc position via the LVDT 15.

LVDT 15 provides adjacent position output meter 20 with an output voltage predeterminately related to the actual position of the disc 17 (and valve opening). As shown in FIG. 2, the voltage output from the LVDT 15, indicating actual valve position, is continuously compared to the 4–20 mA input signal after voltage conversion by voltage converter 22, and amplification by comparator amplifier 21. Split range control 30 permits selection of a desired current range between 4–20 mA (with concomitant voltage conversion) for the disc 17 movement, from valve opening to closing. Voltage deviations from predetermined comparative voltages result in error signals, amplified by error amplifier 25. The error signal is returned to solenoid 11 for adjustment of the magnetic field 19, for the rapid continuous elimination of error signals by continuous micro-adjustments of the solenoid magnetic field output.

As shown, a discrete programming board 26 embodies the comparator amplifier 21; circuitry 23 for reverse acting/direct acting switching; stroking speed circuitry 29 for rate of control of the plunger movement before hydraulic pressure changes in the valve, i.e., providing the slew rate control, between 5% to 105% per second, as described above; and optional valve seat protection circuitry 24. On/off switch 24' enables or disables the value seat protection circuitry 24, whereby it can be brought into or be bypassed. Steady state current limiting is effected as shown in FIG. 2 with ramp limiter 35, to prevent excessive heating of the coil of valve solenoid 11 when the main disc 17 is driven to its limit stop.

It is understood that the above description and drawings are illustrative of the present invention and details contained therein are not to be construed as limitations on the present invention. Changes in components, procedure and structure may be made without departing from the scope of the present invention as defined in the following claims.

What is claimed is:

1. A valve control for a hermetically sealed valve system, wherein said valve system operates with a solenoid driven magnetic actuator controlled by electronic input signals; with the solenoid causing the selective formation of a magnetic force field of predetermined varying strength, to cause controlled movement of a link element, linked to a valve, for the controlled opening and closing of the valve, the improvement comprising said electronic input signals being within a predetermined range having upper and lower limit values, and wherein individual values of said electronic input signals, within said predetermined range, are calibrated to specific valve positions between said opening and closing of the valve, with one of said upper and lower limit values being calibrated to a closed valve position and the other of said upper and lower limit values being calibrated to a fully opened valve position; said valve system further including comparator means, actual valve position monitoring means, and deviation control means; wherein the comparator means continuously compares the electronic input control signals, calibrated to a predetermined specific valve position, and electronic feedback signals from the actual valve position monitoring means; said electronic feedback signals being calibrated to predetermined valve positions; whereby actual position deviation of the valve, from a desired input position, generates an error signal from the deviation control means, with said error signal causing said solenoid to change the strength of the magnetic force field, with concomitant change in valve position, until said error signal is substantially eliminated, wherein the actual valve position monitoring means comprises a linear variable differential transformer (LVDT) adapted to monitor movement of the link element, with actual position of the valve being monitored thereby, and wherein the LVDT creates voltages, each being predeterminately related to a different valve position, as the electronic feedback signals.

2. The valve control of claim 1, wherein the hermetically sealed valve system comprises a hydraulic controlled system.

3. The valve control of claim 2, wherein movement of said link element causes movement of a pilot element, which pilot movement, in turn, varies distribution of hydraulic fluid pressure in the valve system, to permit controlled opening and closing of the valve.

4. The valve control of claim 3, wherein the electronic input signals range between original upper and lower end limits for valve closing and fully opening, and wherein said valve control comprises split ranging means for varying the input signal range limits, for valve closing and fully opening, between the original upper and lower end limits.

5. The valve control of claim 4, wherein said valve control further comprises direct acting/reverse acting selector means to allow assignment of the direction of valve movement with respect to the input signal.

6. The valve control of claim 3, wherein said valve control further comprises slew rate control means comprised of first and second independent, continuously variable controls, with the first control allowing for selection of the valve opening slew rate over a percentage/unit time range, and wherein the second control allows the valve closing slew rate over the same percentage/unit time range.

7. The valve control of claim 3, wherein said valve control further comprises shutoff seat protection means with enabling/disabling selection means.

8. The valve control of claim 3, wherein said valve control further comprises steady state current limiting means to reduce power to a coil of the solenoid when the valve is driven to a limit stop, and wherein the reduction of power does not cause the valve to back out of the limit stop.

9. The valve control of claim 1, wherein said electronic input signals comprise milliampere signals and wherein said predetermined range is between 4–20 milliamperes.

10. The valve control of claim 9, wherein said valve control further comprises a voltage converter which converts the milliampere signals to voltages, with said comparator means comparing the voltages from the voltage converter to voltages created by the LVDT.

* * * * *